United States Patent [19]

Kress et al.

[11] 4,166,711

[45] Sep. 4, 1979

[54] CHUCKING REAMER WITH REPLACEABLE CUTTER

[75] Inventors: Dieter Kress, Aalen; Friedrich Häberle, Lauchheim, both of Fed. Rep. of Germany

[73] Assignee: Mapal Fabrik für Prazisionswerkzeuge Dr. Kress KG, Aalen, Fed. Rep. of Germany

[21] Appl. No.: 871,925

[22] Filed: Jan. 24, 1978

[30] Foreign Application Priority Data

Jan. 22, 1977 [DE] Fed. Rep. of Germany ....... 2702620

[51] Int. Cl.$^2$ ............................................. B23B 51/00
[52] U.S. Cl. .................................................. 408/233
[58] Field of Search ............... 408/231, 232, 233, 239; 407/31, 47, 64

[56] References Cited

U.S. PATENT DOCUMENTS

| 804,602 | 11/1905 | Howk | 408/233 |
|---|---|---|---|
| 1,515,548 | 11/1924 | Cerotsky | 408/233 |
| 3,087,360 | 4/1963 | Garberding | 407/47 |
| 3,137,059 | 6/1964 | Hertel | 407/104 |
| 3,490,117 | 1/1970 | Hertel | 407/104 |
| 4,011,049 | 3/1977 | McCreery | 407/103 |

*Primary Examiner*—Harrison L. Hinson
*Attorney, Agent, or Firm*—Toren, McGeady and Stanger

[57] ABSTRACT

The replaceable, annular cutter of a chucking reamer is coaxially centered on the shank by an axial clamping stud partly received in respective bores of the cutter and the shank by engagement of tapering annular faces on the head of the stud and about the bore orifice in the front face of the cutter, the stud being urged inward of the bore by a set screw on the shank engaging an obliquely sloping face of the stud portion conformingly received in the shank bore, the stud being received in the cutter bore with radial clearance.

7 Claims, 2 Drawing Figures

U.S. Patent  Sep. 4, 1979  4,166,711
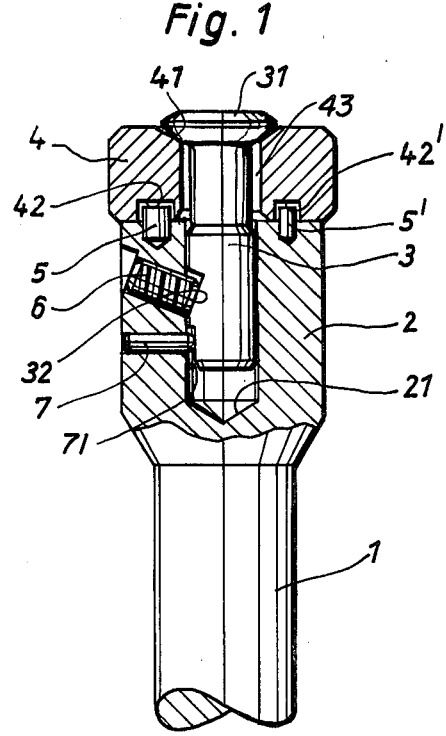
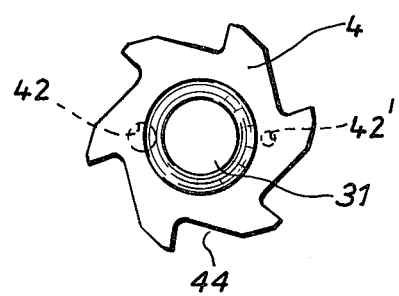

CHUCKING REAMER WITH REPLACEABLE CUTTER

This invention relates to chucking or machine reamers, and particularly to an improved chucking reamer having a replaceable, annular cutter coaxially mounted on the front end of the reamer shank.

A cutter is conventionally mounted on the shank of a chucking reamer by means of a clamping element which is received in coaxial bores of the cutter and shank and permits the cutter to be removed for grinding or replacement without releasing the shank from the chuck of the reaming machine, thereby simplifying the necessary precise alignment of the axial cutting blade or blades on the cutter with the axis of reamer rotation. The axially engaged radial end faces of the shank and cutter are ground flat and precisely perpendicular to the axis of rotation, but precise work cannot be produced without centering the cutter on the shank. When the clamping element is tightened, it must not exert a force on the cutter which would prevent area contact between the planar radial faces. The bores in the cutter and shank must be precisely aligned, and such alignment is achieved in known reamers of the type described above only at significant cost.

It is a primary object of this invention to achieve the proper coaxial alignment of shank and cutter in a simple and effective manner.

With this object and others in view, as will hereinafter become apparent, the invention employs a straight, elongated, clamping stud one longitudinal portion of which is received conformingly in the axial bore of the shank. A second, longitudinal stud portion is received in the bore of the cutter with radial clearance, and the enlarged stud head fixedly attached to the second stud portion has an annular face tapering inward of the bore in the front face of the cutter, the orifice of the bore flaring in an outward direction. The annular face of the stud head is held in abutting engagement with the cutter in the orifice of the latter by a setscrew threadedly received in a secondary bore of the shank which is obliquely inclined to the axis of rotation and communicates with the axial bore of the shank. The setscrew abuttingly engages a face of the first stud portion which slopes obliquely toward the axis and the second stud portion.

Other features, additional objects, and many of the attendent advantages of this invention will readily be appreciated as the same becomes better understood by reference to the following detailed description of a preferred embodiment when considered with the appended drawing in which:

FIG. 1 shows a chucking reamer of the invention in a radial view, partly in section on the reamer axis, the rear end of the shank being broken away; and FIG. 2 is a frontal, axial end view of the reamer of FIG. 1.

Referring now to the drawing in detail, there is shown a straight reamer shank 1 of circular cross section. The enlarged, cylindrical front end 2 of the shank is formed with a central, axial, blind bore 21. The free end of a clamping stud 3 is received in the bore 21 with a tight sliding fit. The approximately lens-shaped head 31 of the stud 3 is partly recessed in the flaring orifice 41 of a central, axial bore 43 in an annular cutter 4 whose circumference is formed with six, straight, axial flutes 44 separating cutting blade portions of the cutter 4.

The annular face of the cutter 4 which bounds the orifice 41 is conical with an apex angle of about 120° to 150°. The annular face of the head 31 which abuttingly engages the conical face of the cutter is approximately spherically convex so that the two annular faces make approximate line contact in a circular, closed loop about the axis of rotation. Contact pressure between the engaged annular faces is maintained by a setscrew 6 threadedly received in a secondary bore of the shank end 2 which is obliquely inclined to the axis of rotation. The outer axial face of the stud 3 is notched, and the setscrew 6 engages a flat face 32 bounding the notch and sloping at an acute angle toward the axis of rotation and toward the head 31. Tightening of the setscrew 6 causes the stud 3 to be centered in the bore 43 by the annular faces of the head 31 and the cutter 4 engaged in the orifice 41.

Assembly of the cutter 4 with the shank end 2 in the proper angular position is facilitated by a radial locating pin 7 projecting from a further bore in the shank end 2 into the bore 21 and received in an axially open recess 71 extending only over a small part of the circumference of the stud 3 which is otherwise of stepped cylindrical shape. Two cylindrical pins 5,5' of different diameters axially project from the transverse front face of the shank on diametrically opposite sides of the bore 21 into matching recesses 42,42' in the planar rear face of the cutter 4. The pin 7 thus guides the stud 3 into a position in which the axis of the setscrew 6 is perpendicular to the face 32, and the pins 5,5' uniquely determine the angular position of the cutter 4 on the shank 1,2.

Because the annular faces of the head 31 and of the cutter 4 in the orifice 41 are inclined relative to the axis of rotation at an acute angle substantially greater than 45°, seizing of the head 31 in the orifice 41 is safely avoided, and the virtual line contact between the two faces avoids radial shifting of the cutter 4 during tightening of the setscrew 6.

The illustrated cutter 4 has six identical, straight, axial flutes 44 and correspondingly identical cutting blades, but the invention is not limited to any particular number and orientation of the flutes and blades. The locating pins 5,5' are most useful with non-illustrated cutters whose blades are not symmetrical relative to the axis of rotation.

The recess 71 in the illustrated stud 3 is formed by grinding a flat on the stud, but it may have a U-shape in radial section or be shaped otherwise to prepare the stud face 32 for abutting engagement by the setscrew 6 without or with only minimal torque being exerted by the setscrew on the stud 3.

In the illustrated embodiment of the invention, the desired radial clearance between the stud 3 and the bore 43 in the cutter 4 is provided by reducing the diameter of the stud portion adjacent the head 31 as compared to the free end portion conformingly received in the bore 21, and further by making the cylindrical bore 43 of the cutter 4 wider than the bore 21. Only one of these measures may be resorted to without significant change in function.

It is easier to make the face of the cutter 4 in the orifice 4 conical and to give an approximately spherical curvature to the cooperating annular face of the head 31, than to make the wall of the orifice of convex cross section in the plane of FIG. 1 for cooperation with a conical or other annular face on the head 31, and the illustrated arrangement is preferred. However, other cross-sectional shapes achieving the desired centering effect, though at somewhat higher cost, will readily suggest themselves.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. A chucking reamer comprising:
  (a) a shank having an axis and a planar end face transverse to said axis,
    (1) said shank being formed with an axial bore extending inward of said end face and another bore obliquely inclined to said axis and communicating with said axial bore;
  (b) a cutter member having an annular rear face in contact with said end face and an annular front face,
    (1) said cutter member being formed with a bore extending between respective orifices in said front face and rear face,
    (2) said cutter member being formed with at least one axially extending, radially open flute;
    (3) the orifice of said bore in said front face being bounded by an annular face portion of said cutter member flaring in a direction outward of said bore;
  (c) a straight, elongated clamping stud,
    (1) a first longitudinal portion of said stud being conformingly received in the bore of said shank,
    (2) a second longitudinal portion of said stud being received in the bore of said cutter member with radial clearance;
  (d) an enlarged head fixedly attached to said second portion and having an annular face portion tapering inward of said bore in said cutter member,
    (1) one of said annular face portions being convexly arcuate in axial section and engaging the other annular face portion along a closed loop about said axis;
  (e) a setscrew threadedly received in said other bore of said shank,
    (1) said first portion of said shank having a face sloping obliquely toward said axis and toward said second portion,
    (2) said setscrew abuttingly engaging said sloping face and thereby holding said annular face of said head in abutting engagement with said cutter member in the orifice in said face.

2. A reamer as set forth in claim 1, wherein said annular face bounding said orifice in said front face is conical.

3. A reamer as set forth in claim 2, wherein said conical annular face defines an apex angle of 120° to 150°.

4. A reamer as set forth in claim 1, wherein said one annular face portion is the annular face portion of said enlarged head.

5. A reamer as set forth in claim 1, further comprising a pin member axially projecting from said end face and received in an axially open bore of said cutter member, said pin member being radially spaced from said axis.

6. A reamer as set forth in claim 5, further comprising a second pin member axially projecting from said end face and received in an axially open bore of said cutter member, said pin members being spaced circumferentially from each other and of different cross section.

7. A reamer as set forth in claim 1, further comprising a locating member projecting from said shank into said axial bore, said second longitudinal portion of said stud being formed with an axially open recess receiving said locating member.

* * * * *